United States Patent [19]
Mito et al.

[11] Patent Number: 4,929,817
[45] Date of Patent: May 29, 1990

[54] ELECTROFUSION JOINT

[75] Inventors: Kazunori Mito, Iwakuni; Masahiro Hirata, Hiroshima, both of Japan

[73] Assignee: Mitsui Petrochemical Industries, Ltd., Tokyo, Japan

[21] Appl. No.: 224,658

[22] Filed: Jul. 27, 1988

[30] Foreign Application Priority Data

Jul. 29, 1987 [JP] Japan .................. 62-117411[U]

[51] Int. Cl.⁵ .............................................. H05B 3/58
[52] U.S. Cl. ................................................... 219/544
[58] Field of Search .............. 285/21, 156; 219/535, 219/544

[56] References Cited

U.S. PATENT DOCUMENTS

| | | | |
|---|---|---|---|
| 3,315,986 | 4/1967 | Quick | 285/21 |
| 4,313,053 | 1/1982 | Sturm | 219/535 X |
| 4,618,168 | 10/1986 | Thalmann et al. | 285/21 |
| 4,684,789 | 8/1987 | Eggleston | 219/535 X |
| 4,695,335 | 9/1987 | Lyall | 219/535 X |
| 4,718,698 | 1/1988 | Hill | 285/21 |

FOREIGN PATENT DOCUMENTS

| | | | |
|---|---|---|---|
| 0183188 | 6/1986 | European Pat. Off. | |
| 1615092 | 2/1972 | Fed. Rep. of Germany | |
| 2395661 | 2/1979 | France | 219/544 |
| 1121850 | 7/1968 | United Kingdom | 219/535 |

*Primary Examiner*—Donald A. Griffin
*Attorney, Agent, or Firm*—Sherman and Shalloway

[57] ABSTRACT

An electrofusion joint used as a pipe joint for plastic pipes, wherein a coil electric heating wire is embedded inside and it is heated by application of an electric current after insertion of the plastic pipes to cause fusion-/adhesion at the contact surface therebetween. The characteristic feature is to use one or more means of items (a) to (c) below to improve adhesion of the coil and the resin constituting the joint:

(a) To use adhesive resins for the resin constituting the joint.
(b) To provide a coil with the surface substantially not oxidized.
(c) To cover the surface of the coil with a substance which has an affinity to both the resin and the coil.

17 Claims, 2 Drawing Sheets

ELECTROFUSION JOINT

BACKGROUND OF THE INVENTION

This invention relates to a pipe joint used to connect plastic pipes with each other, and particularly to an electrofusion joint wherein a coiled electric heating wire (referred to as 'coil' hereinafter) is embedded therein and which fuses and adheres at the contact surface to the pipes by thermal fusion by application of an electric current to the coil.

The electrofusion joint has recently been developed as a pipe joint for plastic pipes which are used in water supply and drainage pipes and a gas pipe. It comprises a molded product wherein a coil is embedded in a cylindrical body. The pipes are inserted into the joint from the edges at both sides thereof, and an electric current is applied to the joint to cause thermal fusion at the contact surface with the pipes to accomplish fusion/adhesion between the joint and the pipes. Connection of the pipes may simply be carried out by use of the joint. The operation comprises only application of an electric current to the joint after insertion of the pipes into the joint from the edges at both sides thereof. Thus, the joint has such advantages that the connection work may simply and rapidly be carried out, work efficiency is improved, and connection may be carried out with relatively high reliability as compared to a conventional pipe joint wherein connection of the pipes is carried out by fitting the joint to the pipes which have previously been fused by heating at the contact surface. However, there is a problem in the degree of adherence of the coil to the resin forming the cylindrical body. The thermal conductivity between the coil and the resin depends on the degree of adherence. If the degree of adherence is ununiform, the resin is fused in some parts and is not fused in other parts. Thus, there appears a dispersion in fusion/adhesion properties. The degree of adherence is affected by the temperature of the joint (The degree of adherence decreases by the difference in the thermal expansion of the resin and the coil if the temperature rises, whereas, it increases by the difference in shrinkage when the temperature lowers), the pressure of the fused resin, the residual stress at molding, deterioration of the resin with time, etc. Also, the resin is sometimes peeled off from the coil by shrinkage of the resin in the process of cooling and solidification at molding. If a joint having inferior adherence between the coil and the resin is used, the coil is abnormally heated because the heat is not well absorbed by the coil. This causes degradation and finally wax formation of the peripheral resin. These cause a decrease in fusion/adhesion properties.

SUMMARY OF THE INVENTION

The goal of the invention is to improve the fusion/adhesion properties of the joint with the pipes by an improvement of the adherence between the coil and the resin forming the electrofusion joint.

The invention makes use of one or more means of (a) to (c) described below to increase the interfacial adhesive strength between the coil and the resin in the electrofusion joint.

(a) To compose the resin itself of an adhesive resin.
(b) To provide a coil with the surface substantially not oxidized.
(c) To cover the surface of the coil with a substance which has an affinity (adhesiveness) to both the coil and the resin.

Furthermore, the invention may effectively be used by making use of adhesive resin in the resins comprising the pipes to be connected.

DESCRIPTION OF THE PREFERRED EMBODIMENTS

Figure 1:
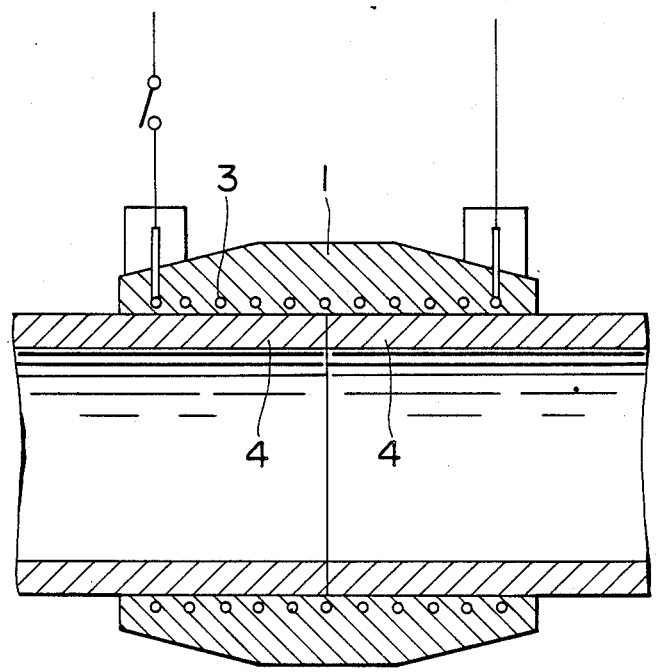
FIG. 1 is a sectional view of the electrofusion joint.
Figure 2:
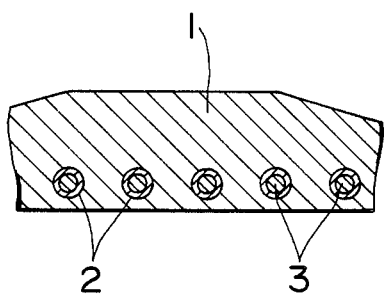
FIG. 2 is a partly expanded sectional view of the same joint.

The invention will be described with reference to the preferred embodiments below.

First, the resin to constitute the joint described in (a) above will be described.

For example, of polyolefins which are typical resins constituting the joint, modified polyolefins and coupling agents may be illustrated as a substance having affinities to the coil. They include polyolefin A modified by unsaturated carboxylic acids or derivatives thereof, polyolefin B modified by unsaturated epoxy monomers. and polyolefin C modified by silane monomers having olefinic unsaturated bonds.

These will be described in more detail.

Modified polyolefin A described above includes those prepared by random copolymerization or block copolymerization of monomers comprising the polyolefins and unsaturated carboxylic acid monomers, or by graft copolymerization of unsaturated carboxylic acids to polyolefins. The constitutional unit of the unsaturated carboxylic acids or derivatives thereof include, for example, unsaturated carboxylic acids such as acrylic acid, methacrylic acid, α-ethylacrylic acid, maleic acid, fumaric acid, itaconic acid, citraconic acid, tetrahydrophthalic acid, methyltetrahydrophthalic acid, endo-cis-bicyclo [2.2.1]-hepto-5-en-2,-3-dicarboxylic acid (nagic acid ®), and methyl-endo-cis-bicyclo [2.2.1]hepto-5-en-2,3-dicarboxylic acid (methylnagic acid ®), and derivatives of the unsaturated dicarboxylic acids such as acid halides, amides, imides, acid anhyrides and esters of said unsaturated dicarboxylic acids. The derivatives of unsaturated dicarboxylic acids include, for example, maleanil chloride, maleimide, maleic anhydride, citraconic anhydride, maleic acid monomethyl ester and maleic acid dimethyl ester. Of these, unsaturated dicarboxylic acids or acid anhydrides thereof and particularly maleic acid and nagic acid or acid anhydrides thereof are preferred.

Modified polyolefin B is also prepared by incorporating the unsaturated epoxy monomers into polyolefins by random copolymerization, block copolymerization and graft copolymerization. The unsaturated epoxy monomers represent those monomers having one or more unsaturated bonds capable of polymerization and epoxy groups in a molecule thereof. Said unsaturated epoxy monomers include, for·example, unsaturated glycidyl esters shown by the general formula,

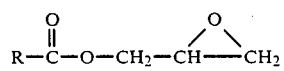

(where R represents a hydrocarbon group having an ethylenic unsaturated bond capable of polymerization), unsaturated glycidyl ethers shown by the general formula,

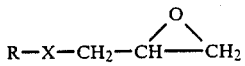 [II]

(where R represents the same as in formula [I], and X represents a divalent group represented by

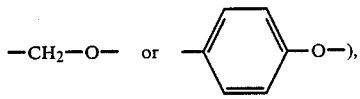

and epoxy alkenes shown by the general formula,

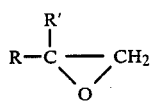 [III]

(where R represents the same as in formula [I], and R' represents a hydrogen atom or a methyl group).

For example, they include glycidyl acrylate, glycidyl methacrylate, mono- and diglycidyl esters of itaconic acid, mono-, di- and triglycidyl esters of butene tricarboxylic acids, mono- and diglycidyl of esters of citraconic acid, mono- and diglycidyl esters of endo-cis-bicyclo [2.2.1]-hepto-5-en-2,3-dicarboxylic acids (nagic acid ®), mono- and diglycidyl esters of endocis-bicyclo [2.2.1]hepto-5-en-2-methyl-2,3dicarboxylic acid (methylnagic acid ®), mono- and diglycidyl esters of allylsuccinic acid, glycidyl esters of p-styrene carboxylic acids, allyl glycidyl ether, 2-methylallyl glycidyl ether, styrene-p-glycidyl ether, 3,4-epoxy-1-butene, 3,4epoxy-3-methyl-1-butene, 3,4-epoxy-1-pentene, 3,4-epoxy-3-methyl-1-pentene, 5,6-epoxy-1-hexene and vinylcyclohexene monoxide. Of these, glycidyl acrylate and glycidyl methacrylate should be preferred, Modified polyolefin C is also prepared by incorporating said silane monomers into polyolefin by random copolymerization, block copolymerization and graft copolymerization in the same manner as in modified polyolefins A and B as described above, Any of silane monomers having olefinic unsaturated bonds may be used, however, those silane monomers having hydrolyzable organic groups in addition to the olefinic unsaturated bonds should be preferred. For example, they are illustrated by the following general formulae.

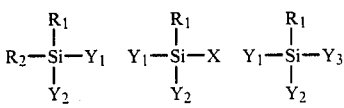

In the formula, R₁ and R₂ are the same or different monovalent groups which have olefinic unsaturated bonds and comprise carbon atoms, hydrogen atoms and arbitrarily oxygen atoms. These groups include, for example, vinyl, allyl, butenyl,. cyclohexenyl and cyclopentadienyl groups.

In particular, unsaturated groups having double bonds at their ends are preferably used. In particular, unsaturated groups with end double bonds and ester groups adjacent to the bonds are used more preferably.

Examples of such groups are hydrocarbon groups as expressed by the following formulae:

$CH_2=C(CH_3)COO(CH_2)_3-$ $CH_2=C(CH_3)COO(CH_2)_2\text{-o-}(CH_2)_3-$ $CH_2=C(CH_3)COOCH_2OCH_2CH_2(OH)CH_2O(CH_2)_3-$ Of these, vinyl group is most preferred. X represents an organic group having no olefinic unsaturated bonds. It includes, for example, monovalent hydrocarbon groups such as methyl, ethyl, propyl, tetradecyl, octadecyl, phenyl, benzyl and tolyl groups. These hydrocarbon groups may partially be substituted by halogen atoms. Groups $Y_1$, $Y_2$ and $Y_3$ are the same or different hydrolyzable groups including, for example, alkoxy groups such as methoxy, ethoxy, butoxy and methoxyethoxy groups, alkoxyalkoxy groups, acyloxy groups such as formyloxy, acetoxy and propionoxy groups, oximes such as $-ON=C(CH_3)_2$, $-ON=CHCH_2C_2H_5$ and $-ON=C(C_3H_7)_2$, and substituted amino groups and alkylamino group such as $-NHCH_3$, $-NHC_3H_7$ and $-N(C_3H_7)_2$, and any other hydrolyzable organic groups.

A preferred organic silicon compound is represented by the general formula,

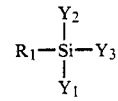

and particularly that having $Y_1$, $Y_2$, and $Y_3$ the same as each other. Of these vinyl trisalkoxysilane is preferred. It includes, for example, vinyltrimethoxysilane, vinyltriethoxysilane and vinyltris(methoxyethoxy)silane. However, vinylmethyldiethoxysilane and vinylphenyldimethoxysilane may be used in the same manner.

Of the modified polyolefins described above, those having grafted polyolefin modifier monomers should particularly be preferred. Various known methods may be adopted to prepare a graft copolymer. They include, for example a method in which graft copolymerization is carried out for a mixture of molten polyolefins and the polyolefin modifier monomers, and a method in which copolymerization is carried out for a mixture consisting of polyolefins dissolved in a solvent and the polyolefin modifier monomers. In either method reaction should preferably be carried out in the presence of radical initiators to carry out graft copolymerization effectively. Said radical initiators include organic peroxides, organic peroxide esters and azo compounds. Electrolytically dissociating radiation, ultraviolet rays, etc. may also be used for radical generation. The grafting rate should preferably be 1–15 parts by weight of polyolefin modifier monomers to 100 parts by weight of polyolefins.

The polyolefins as raw material for the modified polyolefins should desirably be the same as the polyolefins constituting the pipe (e.g., polyethylene for a polyethylene pipe and polybutene-1 for a polybutene-1 pipe).

The coupling agents which may be used in the invention include vinyltrimethoxysilane, vinyltriethoxysilane, vinyltris(β-methoxyethoxy)silane, vinyltriacetylsilane, γ-methacryloxypropyltrimethoxysilane, γ-glycidoxypropyltrimethoxysilane, γ-glycidoxypropyltrimethoxysilane, β-(3,4-epoxycyclohexyl) ethyltrimethoxysilane, γ-mercaptopropyltrimethoxysilane, β-mercaptoethyltriethoxysilane, γ-chloropropyltrimethoxysilane, γ-chloropropyltriethoxysilane, vinyltrichlorosilane, γ-aminopropyltrimethoxysilane, γ-aminopropyltriethoxysilane, N-β(aminoethyl)γ-aminopropyltrimethoxysilane, N-β(aminoethyl)γ-aminopropylmethyldimethoxysilane, γ-(diethylenetriamino)-propyltrimethoxysilane, γ-ureidopropyltriethoxysilane, imidazolinetriethoxysilane, γ-[N-(β-methacryloxyethyl)-N,N-dimethylammonium(chloride)]propyltrimethoxysilane, styryldiaminosilane, aminodi(trimethyl)silane, (3-diaminomethylthiopropyl)silane, bis-(3-triethoxysilylpropyl)-tetrasulfan, γ-chloropropyltriethoxysilane, etc.

The adhesive resin constituting the joint mentioned above may consist of said modified polyolefins alone described above or a mixture of said modified polyolefins and unmodified polyolefins.

The coil used in the invention may be made of conventionally known electric heating material such as copper alloy, nickel-chromium steel Class I and Class II and iron-chromium steel Class I and Class II, Chromel A, Constantan and Manganin. Also a single metal wire of relatively high resistance (e.g.,cerium and bismuth) may be used in addition to said alloys.

Item (b) of the invention provides a coil the surface of which is not substantially oxidized. Said coil having the surface substantially not oxidized includes a metal wire which is obtained by removal of an oxidized film of passive state at the surface as well as a metal wire just after refining. The adhesiveness of the coil to the resin constituting the joint may be improved by use of said coil.

Figure 3:
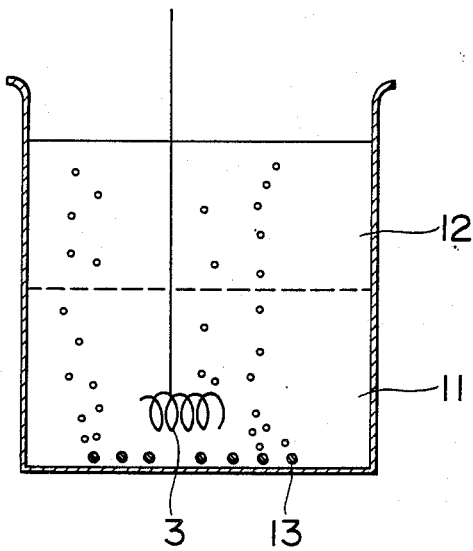
FIG. 3 is a sectional view of an apparatus for removing oxidized film at the surface of a metal coil.

A method for removing the oxidized film at the surface of the metal coil includes reduction of the metal wire at the surface. For example, a method consisting of degreasing of the oil at the surface, reduction/corrosion and washing may be illustrated. In more concrete terms, a method described as follows may be illustrated as an example. That is, oily components at the surface of the metal coil are removed by use of a surface active agent, etc. Then a liquid separated into the upper and the lower layers as shown in FIG. 3 which consists of a nonoxidative strong acid solution 11 and a nonpolar solution 12 unmiscible to said strong acid solution 11 is prepared. A metal 13 of a high ionization tendency is put into the strong acid solution to reduce the metal surface by catalytic reaction of the metal coil 3 and a nascent hydrogen generated therein. The oxidized film is removed by the reaction, and the metal coil is pulled up into the nonpolar solution 12 which comes into interfacial contact with the strong acid solution 11 to wash out the strong acid solution adhering to the coil. Then, the coil is pulled out of the nonpolar solution.

Said nonoxidative strong acid solution used in the invention includes, for example, hydrochloric acid. Said nonpolar solution unmiscible to hydrochloric acid includes, for example, benzene and toluene.

Said metal of a high inonization tendency includes, for example, zinc and magnesium.

Reduction may be carried out at ordinary temperature and pressure.

Next, the composition of item (c) of the invention will be described.

This provides a means for improving the adherence between the resin constituting the joint and the coil by covering the coil with a substance which has affinities (adhesive affinities) for both the resin and the coil surface.

Modified polyolefins and other resins illustrated in item (a) above may be used for the covering substance.

The above described each compositions of the invention. Any one of compositions (a), (b) and (c) may be selected, or two or more of them may be used in combination.

Furthermore, in addition to the selection and combination of compositions (a),(b) and (c), selection of the materials of the pipes to be connected by use of the joint of the invention is important. If the same resins as used in the joint in item (a) are used, a pipe joint structure of a strong joint structure may be obtained by use of the joint of the invention.

Figure 4:
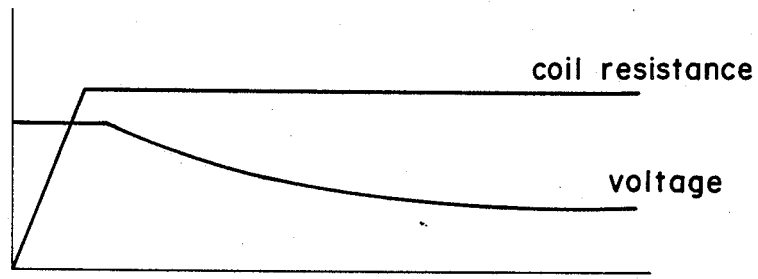
FIGS. 4 and 5 are diagrams.
Figure 5:
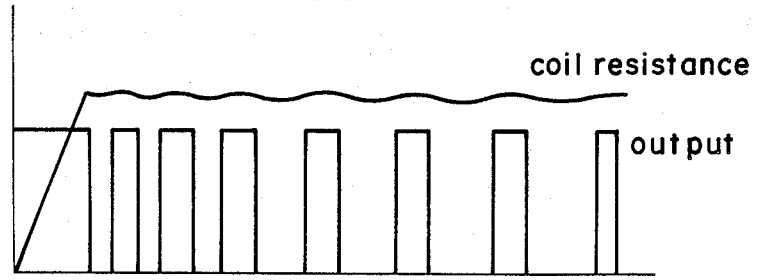

Of them, a modified or unmodified polyolefin mixture should preferably be used for the resins constituting the joint and/or the pipe. In addition, the coil should desirably be covered with modified polyolefins at the surface. Thus, the adherence of the coil and the resin may be increased by an increase in the interfacial adhesive strength between the two as mentioned above. Furthermore, the resistance value of the coil should desirably be maintained constant to eliminate deterioration of the resin which is in contact with the coil in consideration of a case wherein the coil is abnormally heated in spite of the above means. As a method for maintaining the resistance value of the coil, a method in which the current is detected to adjust the voltage by the detected value (Refer to FIG. 4) and a method in which intermittent heating is carried out under control of the output by the current value (Refer to FIG. 5) may be illustrated as examples.

Also, the coil or the surface thereof should desirably by covered with an insulating substance. This is because of the following reasons.

If the resin is fluidized at fusion/adhesion, it sometimes causes a shift of the coil resulting in a short-circuit at the coil. If a short-circuit is made, an abnormal electric current flows to cause insufficient fusion/adhesion.

Said insulating substance used to cover the coil includes, for example, heat-resisting insulating varnish, inorganic or organic heat-resisting insulating paint, a heat-resisting tape, a woven fabric and yarn. Concretely, said heat-resisting insulating varnish includes shellac (tris-2-hydroxyethyl isocyanurate)-modified polyester insulating varnish, polyester imide insulating varnish, shellac-modified polyester imide insulating varnish, polyamideimide insulating varnish, polyimide insulating varnish, polyester amide imide insulating varnish, polyhydantoin-modified polyester insulating varnish, silicon resin insulating varnish and polysiloxane resin insulating varnish.

Said inorganic heat resisting paint includes alkali silicate heat-resisting paint, colloidal silica heat-insulating paint, acid metal phosphoric acid type heat-resisting paint and dichromic acid phosphoric acid type heat-resisting paint.

Said organic heat-resisting paint includes organic silicate heat-resisting paint and organic titanate heat-resisting paint.

Said heat-resisting tape includes glass cloth and a glass fiber.

If the surface of the coil is covered with an adhesive substance as described above, it is covered with the adhesive substance after covering with the insulating substances. Degreasing, reduction, etching or rinsing is necessary also in this case, in order to enhance the adhesion between the coil and the insulator.

The joint according to the present invention is produced by setting a coil in a cylindrical mold and then injecting one of the described resin materials into the mold.

Various illustrations have been made above, however, the best example can embody a joint in which a coil 3 covered with modified polyethylene 2 is embedded inside an electrofusion joint 1, and the resin constituting the joint consists of a mixture of modified and unmodified polyethylene. The mode of connecting polyethlene pipes 4 by means of the joint may be illustrated.

According to the electrofusion joint of the invention, the interfacial adhesive strength between the coil and the resin is reinforced, and an increase in the adherence between the two may eliminate deterioration of the resin and a decrease in the fusion/adhesion properties of the resin caused by overheating of the coil.

What is claimed is:

1. In an electrofusion joint for connecting plastic pipes with each other comprising a molded body, receivable of said pipes, and a metallic heating coil, embedded in said molded body, for application of heat to said molded body and said pipes to thermally fuse said joint and said pipes to one another, the improvement comprising:
   (A) providing said metallic heating coil with a substantially non-oxidized surface; and
   (B) (1) forming said molded body from an adhesive resin or (2) coating the surface of said metallic heating coil with a substance which has an affinity to both of said molded body and said metallic heating coil.

2. The electrofusion joint according to claim 1, wherein said molded body is formed from an adhesive resin.

3. The electrofusion joint according to claim 2, wherein said pipes are formed from polyolefin.

4. The electrofusion joint according to claim 3, wherein said adhesive resin comprises a polyolefin modified by unsaturated carboxylic acids or derivatives thereof; a polyolefin modified by unsaturated epoxy monomers; or a polyolefin modified by silane monomers having olefinic unsaturated bonds.

5. The electrofusion joint according to claim 4, wherein said polyolefin modified by unsaturated carboxylic acids or derivatives thereof is prepared by random or block copolymerization of monomers comprising said polyolefin and said unsaturated carboxylic acids or derivatives thereof, or by graft copolymerization of said unsaturated carboxylic acids or derivatives thereof to said polyolefin.

6. The electrofusion joint according to claim 4, wherein said polyolefin modified by unsaturated epoxy monomers is prepared by random or block copolymerization of monomers comprising said polyolefin and said unsaturated epoxy monomers, or by graft copolymerization of said unsaturated epoxy monomers to said polyolefin.

7. The electrofusion joint according to claim 4, wherein said polyolefin modified by silane monomers having olefinic unsaturated bonds is prepared by random or block copolymerization of monomers comprising said polyolefin and said silane monomers having olefinic unsaturated bonds, or by graft copolymerization of said silane monomers having olefinic unsaturated bonds to said polyolefin.

8. The electrofusion joint according to claim 1, wherein said surface of said metallic heating coil is coated with a substance which has an affinity to both of said molded body and said metallic heating coil.

9. The electrofusion joint according to claim 8, wherein said molded body is formed from polyolefin.

10. The electrofusion joint according to claim 9, wherein said substance which has an affinity to both of said molded body and said metallic heating coil comprises a polyolefin modified by unsaturated carboxylic acids or derivatives thereof; a polyolefin modified by unsaturated epoxy monomers; or a polyolefin modified by silane monomers having olefinic unsaturated bonds.

11. The electrofusion joint according to claim 10, wherein said polyolefin modified by unsaturated carboxylic acids or derivatives thereof is prepared by random or block copolymerization of monomers comprising said polyolefin and said unsaturated carboxylic acids or derivatives thereof, or by graft copolymerization of said unsaturated carboxylic acids or derivatives thereof to said polyolefin.

12. The electrofusion joint according to claim 10, wherein said polyolefin modified by unsaturated epoxy monomers is prepared by random or block copolymerization of monomers comprising said polyolefin and said unsaturated epoxy monomers, or by graft copolymerization of said unsaturated epoxy monomers to said polyolefin.

13. The electrofusion joint according to claim 10, wherein said polyolefin modified by silane monomers having olefinic unsaturated bonds is prepared by random or block copolymerization of monomers comprising said polyolefin and said silane monomers having olefinic unsaturated bonds, or by graft copolymerization of said silane monomers having olefinic unsaturated bonds to said polyolefin.

14. The electrofusion joint according to claim 1, wherein said metallic heating coil is coated with an electrical insulating substance.

15. In an electrofusion process for connecting plastic pipes with each other, said process comprising
   disposing an electrofusion joint about the ends of said pipes to be joined, said electrofusion joint comprising a molded body, receivable of said pipe ends, and a heating coil, embedded in said molded body and having a variable coil resistance, for application of heat to said molded body and said pipes to thermally fuse said joint and said pipes to one another upon passage of an electric current through said heating coil,
   passing an electric current through said heating coil to heat said molded body and said pipes so as to thermally fuse said joint and said pipes to one another,
   the improvement comprising controlling said variable coil resistance to a substantially constant value.

16. The method of claim 15, wherein the electrical current passing through said coil is measured and the voltage applied to said coil is controlled to maintain said coil resistance substantially constant.

17. The method of claim 15, wherein an electrical current is intermittently applied to said coil so as to maintain said coil resistance substantially constant.

* * * * *